United States Patent
Abotabl et al.

(10) Patent No.: US 11,991,688 B2
(45) Date of Patent: May 21, 2024

(54) IN-BAND INTERLEAVED UPLINK AND DOWNLINK COMMUNICATION IN FULL-DUPLEX OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/389,098

(22) Filed: Jul. 29, 2021

(65) Prior Publication Data

US 2022/0116961 A1  Apr. 14, 2022

Related U.S. Application Data

(60) Provisional application No. 63/090,070, filed on Oct. 9, 2020.

(51) Int. Cl.
*H04W 72/1263* (2023.01)
*H04L 5/14* (2006.01)
*H04W 72/0453* (2023.01)
*H04W 72/23* (2023.01)

(52) U.S. Cl.
CPC ........... *H04W 72/1263* (2013.01); *H04L 5/14* (2013.01); *H04W 72/0453* (2013.01); *H04W 72/23* (2023.01)

(58) Field of Classification Search
CPC ............ H04W 72/1263; H04W 72/23; H04W 72/0453; H04L 5/14
See application file for complete search history.

(56) References Cited

U.S. PATENT DOCUMENTS

| | | | |
|---|---|---|---|
| 11,743,897 B2* | 8/2023 | Luo | H04L 27/0006 370/329 |
| 2014/0254410 A1* | 9/2014 | Seo | H04L 5/0055 370/252 |
| 2015/0109969 A1* | 4/2015 | Celebi | H04L 5/0073 370/278 |
| 2017/0280476 A1* | 9/2017 | Yerramalli | H04W 72/1268 |
| 2018/0124790 A1* | 5/2018 | Yerramalli | H04W 72/0453 |
| 2019/0268907 A1* | 8/2019 | Bhattad | H04W 72/0453 |
| 2020/0137780 A1* | 4/2020 | Kim | H04W 72/0453 |
| 2021/0329634 A1* | 10/2021 | Kim | H04L 27/26 |
| 2022/0123885 A1* | 4/2022 | Shin | H04W 74/0833 |
| 2022/0217543 A1* | 7/2022 | Murayama | H04L 5/0044 |
| 2023/0090192 A1* | 3/2023 | Oh | H04L 5/0094 370/329 |

* cited by examiner

*Primary Examiner* — Jael M Ulysse
(74) *Attorney, Agent, or Firm* — Procopio, Cory, Hargreaves & Savitch LLP

(57) ABSTRACT

A user equipment (UE) receives an allocation of resources for full duplex communication including one or more resource block (RB) sets and receives an indication of an uplink interlace pattern for uplink transmission from the UE. The UE transmits, in a full duplex mode, the uplink transmission based on the allocation of the resources and the uplink interlace pattern and monitors, in the full duplex mode, for a downlink transmission over frequency resources of at least a part of the one or more RB sets comprising the uplink transmission from the UE.

30 Claims, 16 Drawing Sheets

IN-BAND INTERLEAVED UPLINK AND DOWNLINK COMMUNICATION IN FULL-DUPLEX OPERATION

CROSS REFERENCE TO RELATED APPLICATION(S)

This application claims the benefit of and priority to U.S. Provisional Application Ser. No. 63/090,070, entitled "IN-BAND INTERLEAVED UPLINK AND DOWNLINK COMMUNICATION IN FULL-DUPLEX OPERATION" and filed on Oct. 9, 2020, which is expressly incorporated by reference herein in its entirety.

TECHNICAL FIELD

The present disclosure relates generally to communication systems, and more particularly, to wireless communication including full duplex resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The wireless communication may be performed by a user equipment (UE). The apparatus receives an allocation of resources for full duplex communication including one or more resource block (RB) sets and receives an indication of an uplink interlace pattern for uplink transmission from the UE. The apparatus transmits, in a full duplex mode, the uplink transmission based on the allocation of the resources and the uplink interlace pattern and monitors, in the full duplex mode, for a downlink transmission over frequency resources of at least a part of the one or more RB sets comprising the uplink transmission from the UE.

In an aspect of the disclosure, a method, a computer-readable medium, and an apparatus are provided for wireless communication. The wireless communication may be performed by a base station. The apparatus transmits an allocation of resources to a UE for full duplex communication including one or more RB sets and transmits an indication of an uplink interlace pattern for uplink transmission from the UE. The apparatus receives an uplink transmission from the UE based on the allocation of the resources and the uplink interlace pattern and transmits a downlink transmission over frequency resources of at least a part of the one or more RB sets comprising the uplink transmission from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
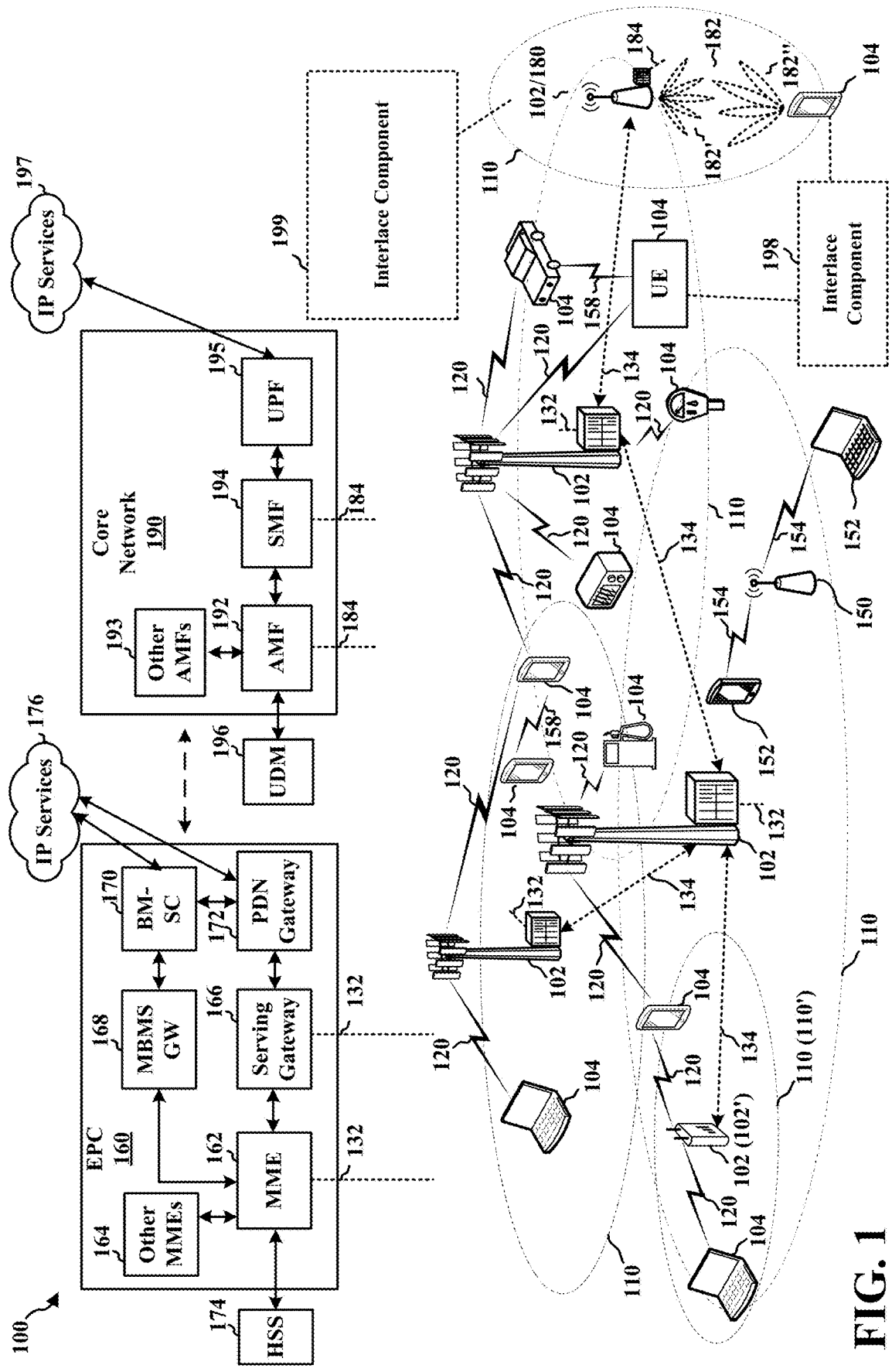
FIG. 1 is a diagram illustrating an example of a wireless communications system and an access network.

Wireless communication systems may be configured to share available system resources and provide various telecommunication services (e.g., telephony, video, data, messaging, broadcasts, etc.) based on multiple-access technologies that support communication with multiple users. In an unlicensed frequency range, a wireless device, such as a UE, may perform a listen before talk (LBT) procedure to determine whether the frequency resources are occupied before transmitting. Frequency resources may be based on a unit size associated with the LBT procedure, e.g., an LBT bandwidth. A power spectral density (PSD) limits or occupied channel bandwidth (OCB) requirement may be associated with the unlicensed frequency resources. A UE may transmit an uplink transmission over one or more assigned RB sets based on an interlaced pattern, e.g., in order to meet the PSD and/or OCB parameters for the unlicensed spectrum. However, unused frequency resources between the uplink interlace may cause an inefficient use of wireless resources.

Aspects presented herein provide for a more efficient use of the wireless resources through full-duplex operation at the UE that includes downlink reception that overlaps with the interlaced uplink transmission. Full duplex operation in which a wireless device exchanges uplink and downlink communication that overlaps in time may enable more efficient use of the wireless spectrum.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In some examples, the UE 104 may include an interlace component 198 that is configured to receive an allocation of resources for full duplex communication including one or more RB sets and receive an indication of an uplink interlace pattern for uplink transmission from the UE. The interlace component 198 may be configured to transmit, in a full duplex mode, the uplink transmission based on the allocation of the resources and the uplink interlace pattern and to monitor, in the full duplex mode, for a downlink transmission over frequency resources of at least a part of the one or more RB sets comprising the uplink transmission from the UE 104.

The base station 102 or 180 may include an interlace component 199 that transmits an allocation of resources to a UE for full duplex communication including one or more RB sets and transmits an indication of an uplink interlace pattern for uplink transmission from the UE. The interlace component 199 may receive an uplink transmission from the UE based on the allocation of the resources and the uplink interlace pattern and transmit a downlink transmission over frequency resources of at least a part of the one or more RB sets comprising the uplink transmission from the UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
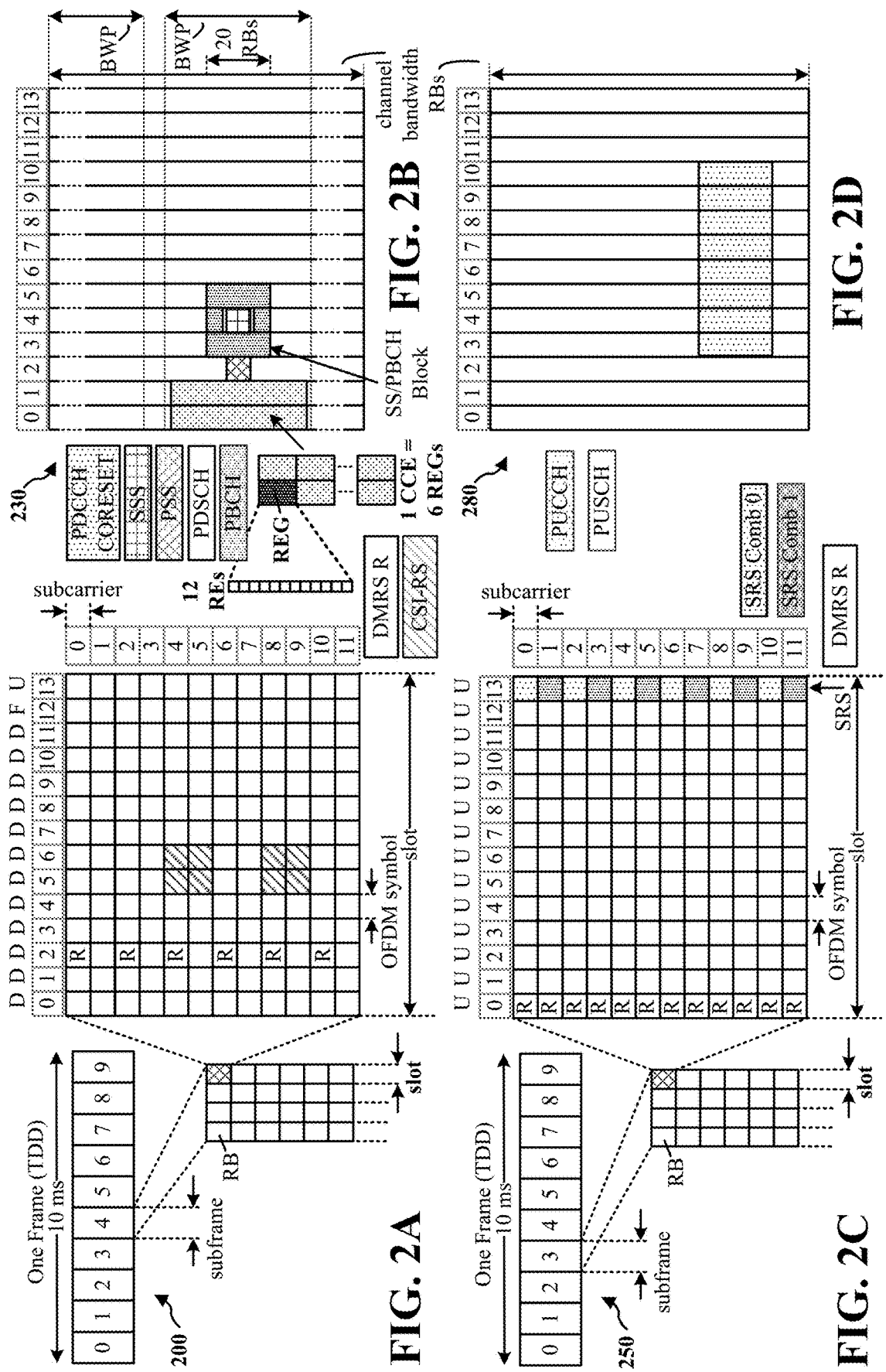
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description also applies to a 5G NR frame structure that is TDD.

FIGS. 2A-2D illustrate a frame structure, and the aspects of the present disclosure may be applicable to other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 12 or 14 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

-continued

| μ | SCS $\Delta f = 2^\mu \cdot 15$ [kHz] | Cyclic prefix |
|---|---|---|
| 3 | 120 | Normal |
| 4 | 240 | Normal |

For a normal CP configuration (e.g., 14 symbols), different numerologies μ 0 to 4 allow for 1, 2, 4, 8, and 16 slots, respectively, per subframe. For extended CP, the numerology 2 allows for 4 slots per subframe per subframe. Accordingly, for slot configuration 0 and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP, e.g., normal or extended.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
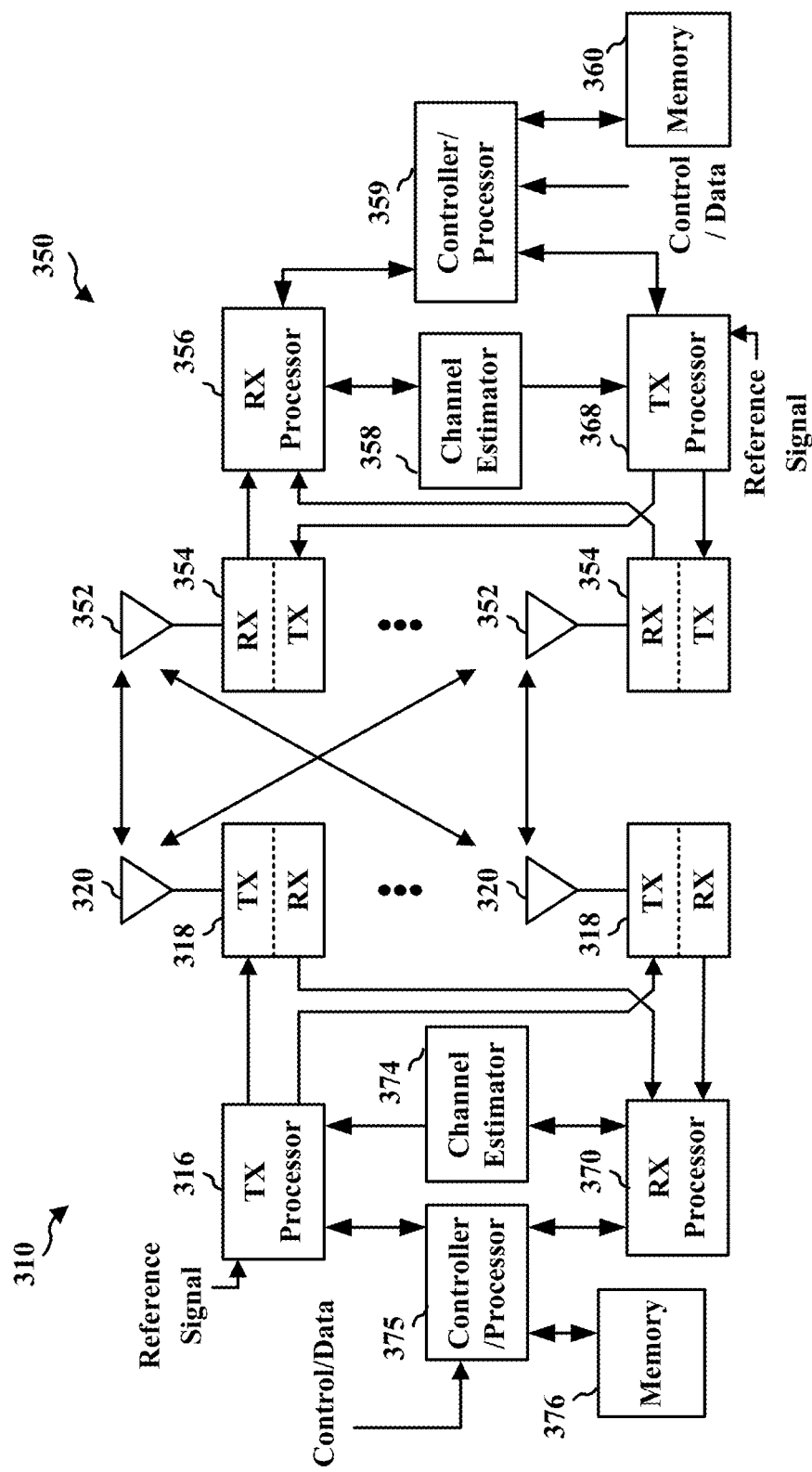
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the interlace component 198 of FIG. 1.

At least one of the TX processor 316, the RX processor 370, and the controller/processor 375 may be configured to perform aspects in connection with the interlace component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex capability may be supported at a base station and/or a UE. For example, a UE may transmit uplink communication from one antenna panel and may receive downlink communication with another antenna panel. In some examples, the full duplex communication may be conditional on beam separation or other conditions.

Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

Figure 4A:
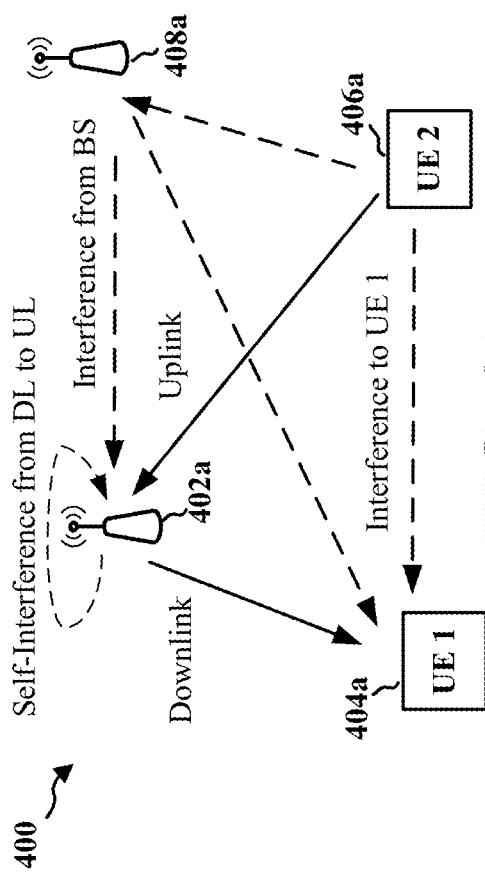
FIGS. 4A, 4B, and 4C illustrate example diagrams of full duplex wireless communication.
Figure 4C:
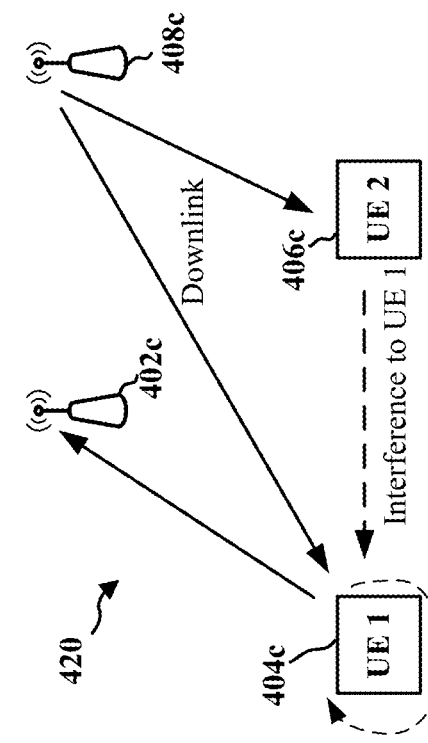
Figure 4B:
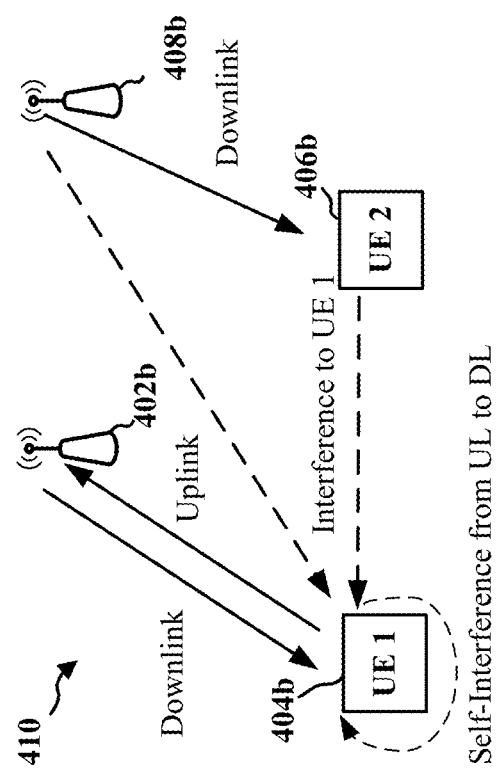

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first base station 402a is a full duplex base station, whereas the first UE 404a and the second UE 406a may be configured as either a half-duplex UE or a full duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a, e.g., overlapping at least partially in time. The base station 402a may experience self-interference in receiving the uplink signal, the self-interference being due to the receiving antenna that is receiving the uplink signal from UE 406a also receiving some of the downlink signal that the base station 402a transmits to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full duplex communication 410 in which a first base station 402b is in full duplex communication with a first UE 404b. In this example, the first base station 402b is a full duplex base station and the first UE 404b is a full duplex UE. The first base station 402b and the UE 404b that can concurrently receive and transmit communication that overlaps in time in a same frequency band. The base station and the UE may each experience self-interference, in which a transmitted signal from the device is leaked to (e.g. received by) a receiver at the same device. The first UE 404b may experience additional interference based on one or more signals emitted from a second UE 406b and/or a second base station 408b in proximity to the first UE 404b.

FIG. 4C shows a third example of full duplex communication 420 in which a first UE 404c transmits and receives full duplex communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of receiving the uplink signal and while receiving the downlink due to the first signal and the second signal being communicated simultaneously. For example, the uplink signal may leak to, e.g., be received by, the UE's receiver. The first UE 404c may experience additional interference from the second UE 406c.

Figure 5:
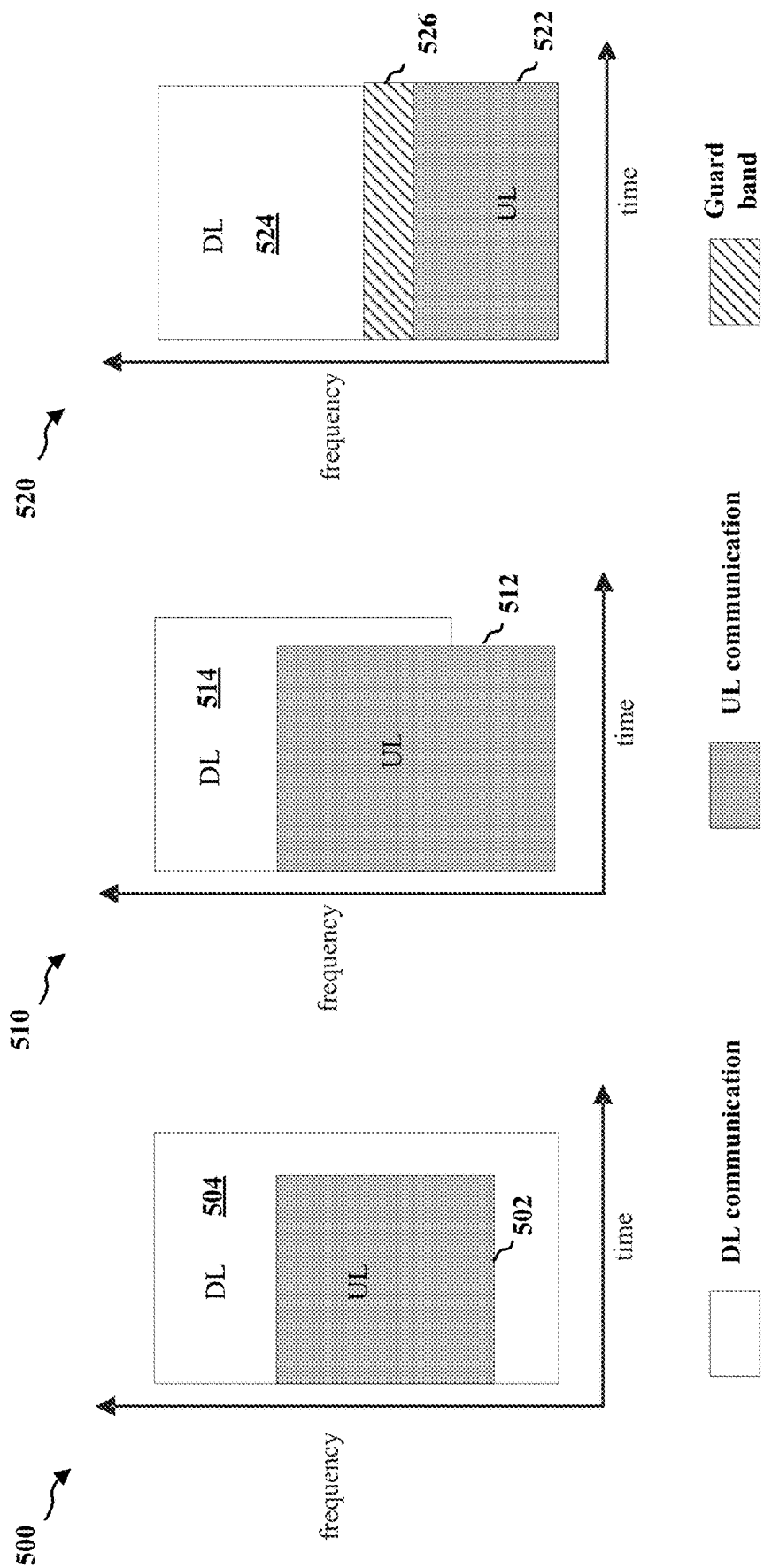
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full duplex (IBFD) resources and a third example 520 of sub-band full-duplex resources, respectively. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band frequency division duplex (FDD), where uplink and downlink resources may overlap in time using different frequencies, as shown in the third example 520. Sub-band FDD full duplex may be referred to as flexible duplex. In the third example 520, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex".

Although the example aspects are described as being for UL resources and DL resources, the resources may similarly be transmission (TX) resources and reception (RS) resources. As an example, if the full-duplex operation is for a UE or a device implementing UE functionality, the resources 502, 512, and 522 may correspond to transmission resources, and the resources 504, 514, and 524 may correspond to reception resources. Alternatively, if the full-duplex operation is for a base station or a device implementing base station functionality, the resources 502, 512, and 522 may correspond to transmission resources, and the resources 504, 514, and 524 may correspond to reception resources An unlicensed frequency band may share a frequency spectrum among various wireless technologies. In order to avoid disruption of operation, wireless devices may perform a listen before talk (LBT) procedure before transmitting using resources of the unlicensed band. In the LBT procedure, a device may sense the channel by measuring energy levels in a frequency band in order to attempt to detect use of the frequency resources by another wireless device. If the detected energy in the frequency band is less than a threshold, the wireless device may determine that the channel is available and may use the frequency resources for its transmission. If the detected energy in the frequency band is greater than a threshold, the wireless device may determine that the channel is occupied and may back off (e.g., refrain from using the frequency resources to transmit) and perform another LBT procedure until the channel is available. Once a successful LBT procedure indicates that the channel is available, the device may transmit its transmission.

One example of a wireless technology that may use the unlicensed band is new radio unlicensed (NR-U). For example, NR-U may coexist with WiFi in a 5 GHz and 6 GHz frequency band. WiFi channel access may be in 20 MHz units. NR-U may use 20 MHz as a basic channel access unit, for example, which may be referred to as an LBT bandwidth. The concepts presented herein may also be applied to other sizes of channel access units, e.g., other sizes of LBT bandwidths. Additionally, although aspect of the description may provide examples for NR-U, the concepts described herein may be applicable to other similar areas, such as LTE, LTE-A, CDMA, GSM, and other wireless technologies.

Figure 6:
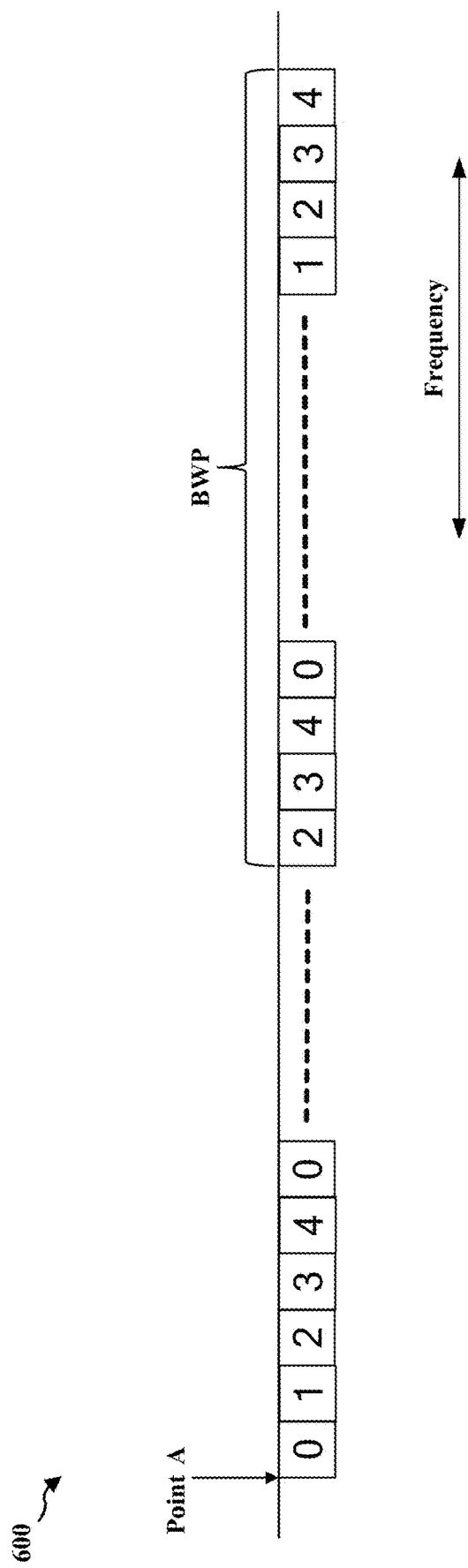
FIG. 6 is a frequency diagram showing an example of RB sets in a frequency band.

The available RBs in each LBT bandwidth may be referred to as an RB set. FIG. 6 illustrates an example of multiple RB sets (e.g., RB set 0, RB set 1, RB set 2, and RB set 3) that span a BWP. Each RB set may include a set of RBs that span an LBT bandwidth. The RB sets may be derived from intra-cell guard band signaling. The RB sets may be separated by a frequency gap that is referred to as an intra-cell guard band that is configured by an intra-cell guard band parameter that may be provided separately for downlink and uplink resources (e.g., "intraCellGuardBandDL" and "intraCellGuardBandUL"). In some examples, the guard band may be zero RBs, e.g., when the base station or UE is performing all or nothing transmission.

Wireless operation in the 5 GHz band may have associated power spectral density (PSD) limitations and occupied channel bandwidth (OCB) requirements. For example, a PSD limitation may limit the power spectral density to 10 dBm/MHz. An example OCB requirement may require occupancy of 80% of a 20 MHz unit (e.g., an LBT bandwidth). The 80% requirement may indicate that if a device uses frequency resource of an LBT bandwidth (as one example, a 20 MHz unit) that the device transmit using at least 80% of the LBT bandwidth. These are merely one example of a size of a PSD limit and OCB requirement, and they may vary in different regions. The PSD and/or OCB parameters may help to avoid interference within an unlicensed frequency band and/or may promote the efficient use of frequency resources in the unlicensed frequency band. Uplink data (e.g., PUSCH) and control signaling (e.g., PUCCH) by a UE in the unlicensed spectrum may need to satisfy such PSD and OCB parameters. In order to meet the PSD and OCB parameters, a UE may apply a PRB block interlace waveform for uplink transmissions in an unlicensed spectrum. As one example, an LTE-licensed assisted access (LAA) UE may apply a PRB block interlace waveform. An uplink interlace may also be applied by a UE of a different RAT, such as an NR-U UE.

Figure 7:
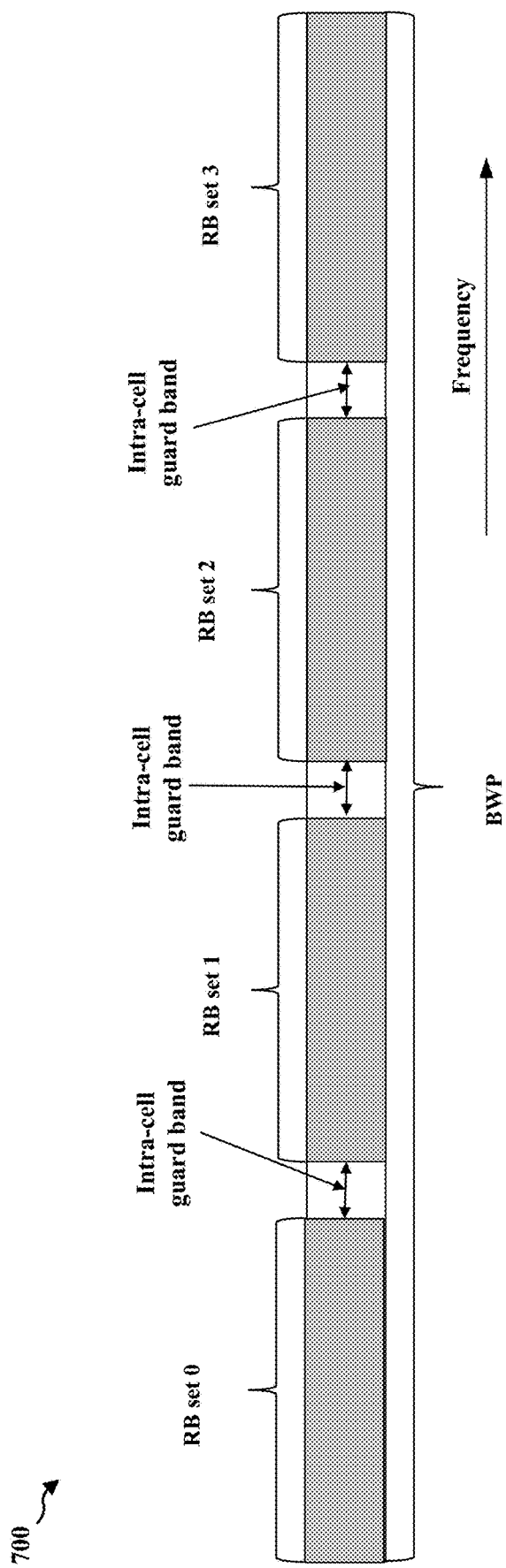
FIG. 7 illustrates an example of a Point A reference point for a frequency range.

The interlace may be based on a reference RB. The reference RB may be referred to as point A. FIG. 7 illustrates an example frequency diagram 700 showing a BWP with reference to a point A reference point. Different numbers of interlaces may be used for different subcarrier spacing (SCS). For example, 10 interlaces may be used (e.g., M=10 interlaces) with a 15 kHz SCS, and five interlaces may be used (e.g., M=5 interlaces) for 30 kHz SCS for all bandwidths. For PUSCH, the interlace waveform may be applied for both DFT-s and CP-OFDM.

A non-interlaced waveform may be supported, e.g., for regions without an OCB requirement or when a full transmit power is not needed. The interlaced waveform for common/dedicated PUCCH/PUSCH may be separately configured, but the UE may not expect the configuration to be different within a cell. In some examples, the UE may be limited from dynamic switching of a waveform, e.g., between an interlaced waveform and a non-interlaced waveform.

Figure 8:
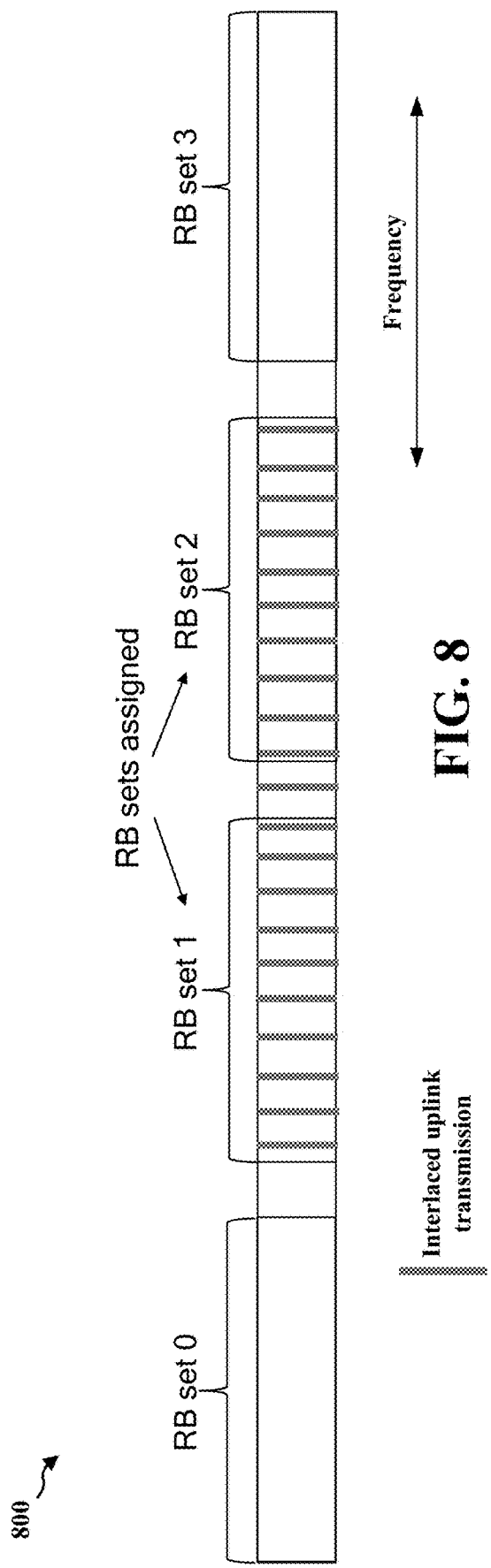
FIG. 8 illustrates an interlace pattern for uplink communication over one or more RB sets.

FIG. 8 illustrates an example of an interlaced waveform 800, e.g., for PUSCH, that is spread across RB set 1 and RB set 2 with frequency gaps between the interlaced PUSCH transmission. For a DFT-s PUSCH, if the allocated number of RBs is not in the form $2^a 3^b 5^c$, the ending RBs can be dropped. The allocated number of RBs may be the assigned number of RBs, e.g., RB set 1 and RB set 2 in FIG. 8. The assigned RBs may be indicated to a UE in a resource allocation from a base station for the uplink transmission. The resource allocation may include an interlace assignment and an RB set assignment. In the resource allocation, X bits may provide the interlace assignment, with X being an integer number. For 30 KHz SCS, x may be equal to 5. A 5 bit bitmap may indicate the possible interlace combinations. For a 15 KHz SCS, X may be equal to 6, with 6 bits indicating a starting interlace index and number of contiguous interlace indices (e.g., resource indicator value (RIV)). Up to 9 remaining RIV values may be used to indicate defined interlace combinations. Y bits of the resource allocation may provide the RB set assignment. For example, the Y bits may be comprised in a particular format of downlink control information (e.g., DCI format 0_1). The RB set assignment may be based on an RIV format that indicates a starting RB set and an ending RB set. The assigned RB sets may be contiguous RB sets beginning with the starting RB set and ending with the ending RB set. If two adjacent RB sets are assigned, the guard band between the RB sets may also be assigned for the UE.

The interlace design leaves frequency gaps between the interlaced PUSCH/PUCCH that are not used for the PUSCH/PUCCH transmission. The frequency gaps may not be used by another UE for another uplink transmission. Aspects presented herein provide for more efficient use of wireless resources by providing for the simultaneous use of the resources for uplink transmission and downlink reception by the UE, e.g., in a full duplex mode, such as described in connection with FIGS. 4A-C and 5. Aspects presented herein also provide for an interleaved design for uplink and downlink communication for full duplex operation.

Figure 12:
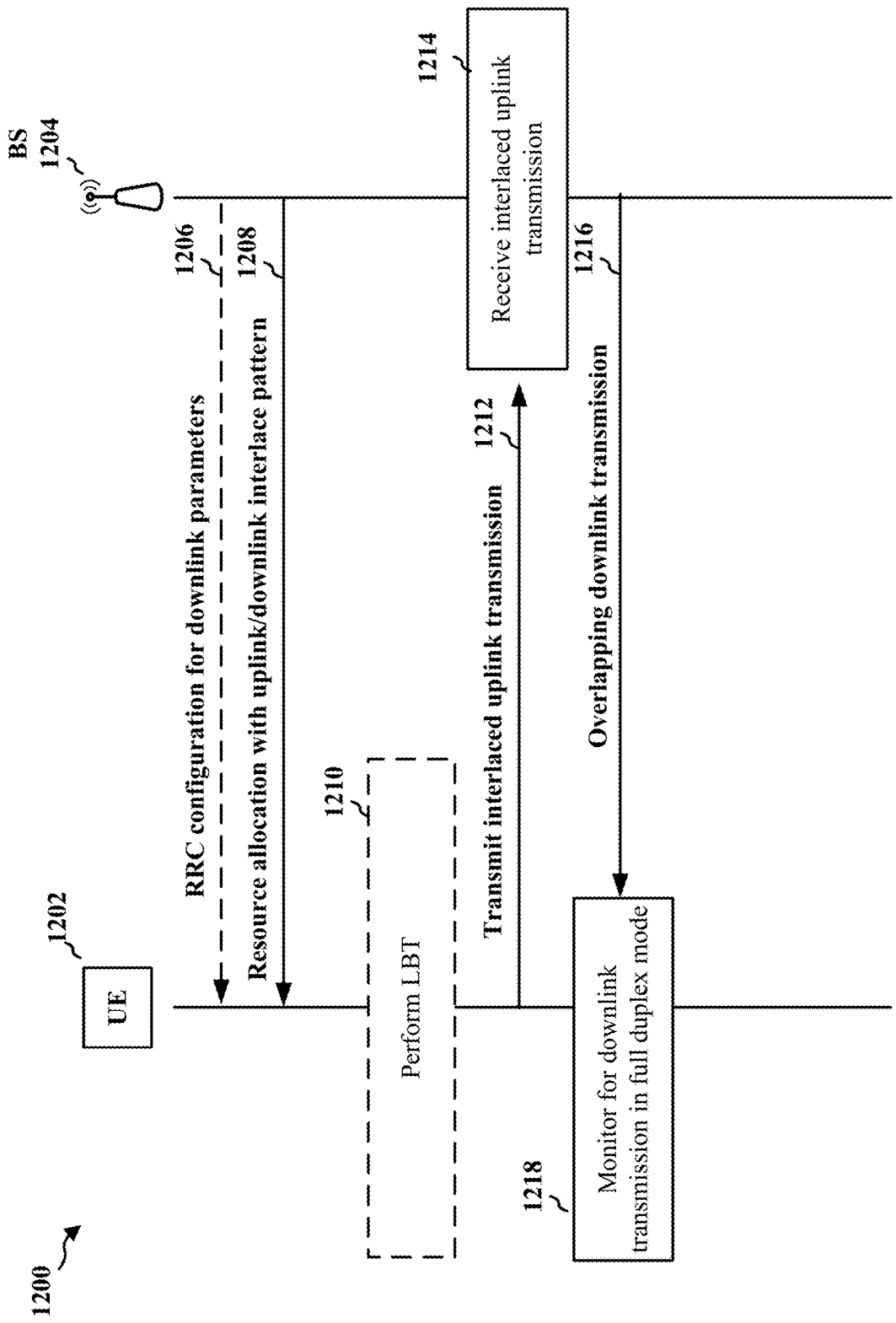
FIG. 12 is a communication flow between a base station and a UE including full duplex communication including an interlace of an uplink transmission.

FIG. 12 illustrates an example communication flow 1200 between a UE 1202 and a base station 1204. The base station may allocate resources for an uplink transmission from the UE in an unlicensed spectrum. For example, the base station 1204 may transmit a resource allocation 1208 that indicates one or more RB sets and an interlace pattern for the uplink transmission. The UE may perform LBT, at 1210 before transmitting using the resource allocation.

Figure 9:
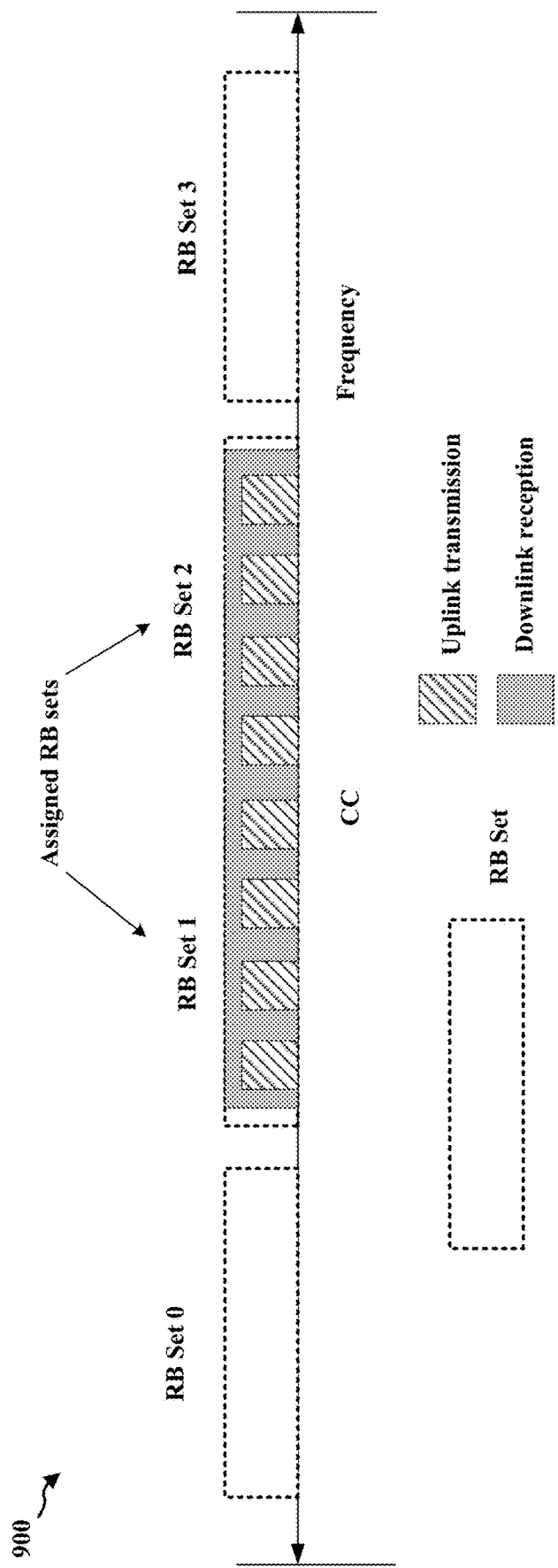
FIG. 9 illustrates an example of full duplex resources for an interlaced uplink transmission and an overlapping downlink transmission.

FIG. 9 illustrates an example in-band interlaced uplink transmission for full duplex communication by a UE. The base station 1204 may configure the UE 1202 with simultaneous uplink and downlink transmissions in an in-band full duplex mode, such as described in connection with FIG. 4B or example 500 or 510 in FIG. 5. The UE 1202 may transmit the uplink transmission 1212 in an interlaced manner on the assigned frequency resources (e.g., the assigned RB sets), and may receive a downlink transmission 1216 that spans a bandwidth of the assigned RB sets. The transmission and reception may overlap in time. FIG. 9 shows that the downlink reception may be over a contiguous frequency resources, while the uplink transmission may be spaced in the interlaced pattern and may overlap with the contiguous frequency resources of the downlink reception. Thus, the UE may monitor for the downlink transmission, at 1218, based on the resources allocated for the interlaced uplink transmission 1212. Similarly, the base station 1214 may receive the interlaced uplink transmission, at 1214 and may transmit a downlink transmission 1216 based on the resources for the interlaced uplink transmission 1212.

The downlink allocation of resources may be either explicitly provided by the base station 1204 to the UE 1202 or may be implicitly indicated to the UE based on the uplink allocation 1208. In the implicit example, the UE may receive an allocation for an uplink transmission that indicates the RB sets and interlace pattern, and the UE may monitor the same frequency range of the interlaced uplink transmission for reception of downlink communication in an in-band full duplex mode. The DL transmission that overlaps with the uplink transmission may have RRC configured transmission parameters 1206, such as the modulation and coding scheme (MCS), rank, etc. The radio network temporary identifier (RNTI) for the downlink transmission can be the RNTI of a semi-persistent scheduling (SPS) transmission or a new RNTI that is particular to the downlink transmission. The uplink transmission grant, may be provided in a PDCCH that includes an indication of whether a downlink transmission will be sent to this UE in the same frequency resources or not. In an example, the indication may be a single bit indication in the PDCCH. In an explicit downlink allocation, the scheduling information for the downlink transmission may be transmitted to the UE by the base station. The scheduling information may be provided in the resource allocation 1208 or may be provided in a separate resource allocation. The downlink transmission may be dynamically scheduled or may be semi-statically configured, e.g., SPS resources configured by RRC signaling.

Figure 10:
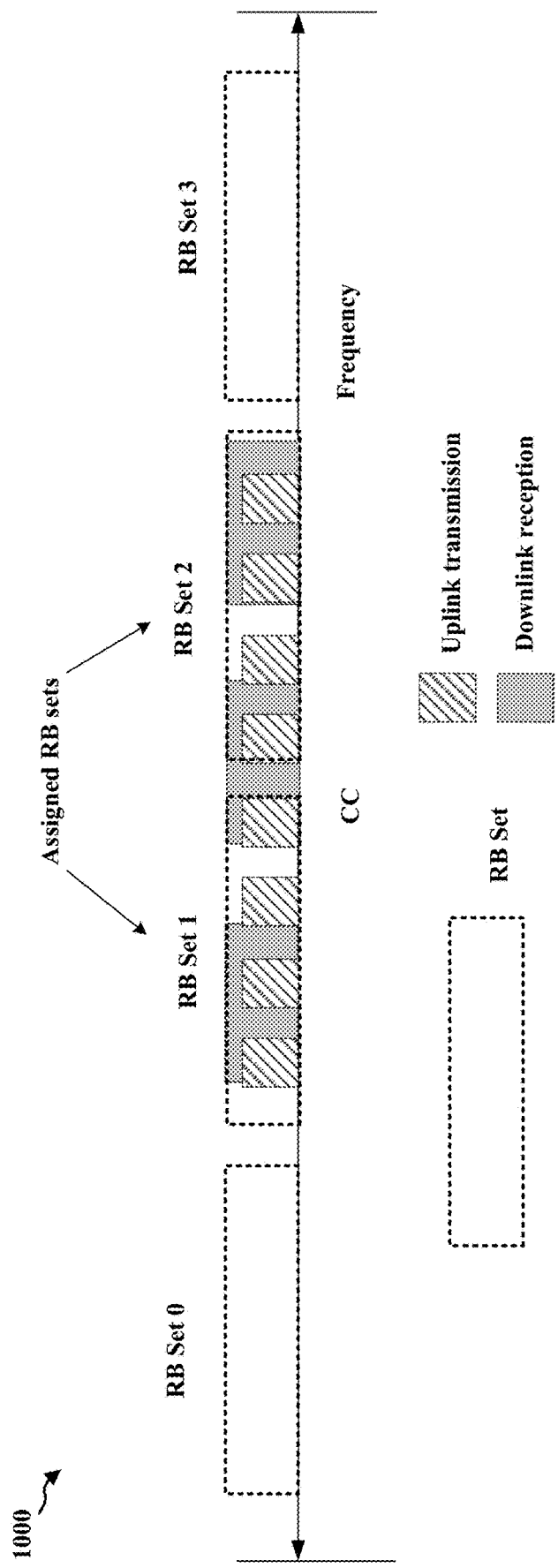
FIG. 10 illustrates an example of full duplex resources for an interlaced uplink transmission and an interlaced downlink transmission.

FIG. 10 illustrates a frequency diagram 1000 similar to the example in FIG. 9 that may include in-band full duplex communication with an interlaced uplink transmission, such as over one or more LBT bandwidths of an unlicensed spectrum. In contrast to the example 900 in FIG. 9, in FIG. 10, the downlink reception may be interlaced along with the interlacing of the uplink transmission. The base station 1204 may configure the UE 1202 with simultaneous uplink and downlink transmissions in an in-band full duplex mode where both the downlink and the uplink transmissions are interlaced. Similar to the examples given for the uplink allocation, the downlink resource allocation (e.g., downlink grant or downlink configuration) may indicate an interlace pattern for the downlink reception. As illustrated in FIG. 10, the interlace pattern for the downlink reception may be different than the interlace pattern of the uplink transmission. The base station 1204 may indicate the interlace design of the downlink transmission to the UE in a bitmap format, in some examples. In some examples, the base station may indicate the interlace design of the downlink transmission to the UE with an RIV format.

Figure 11:
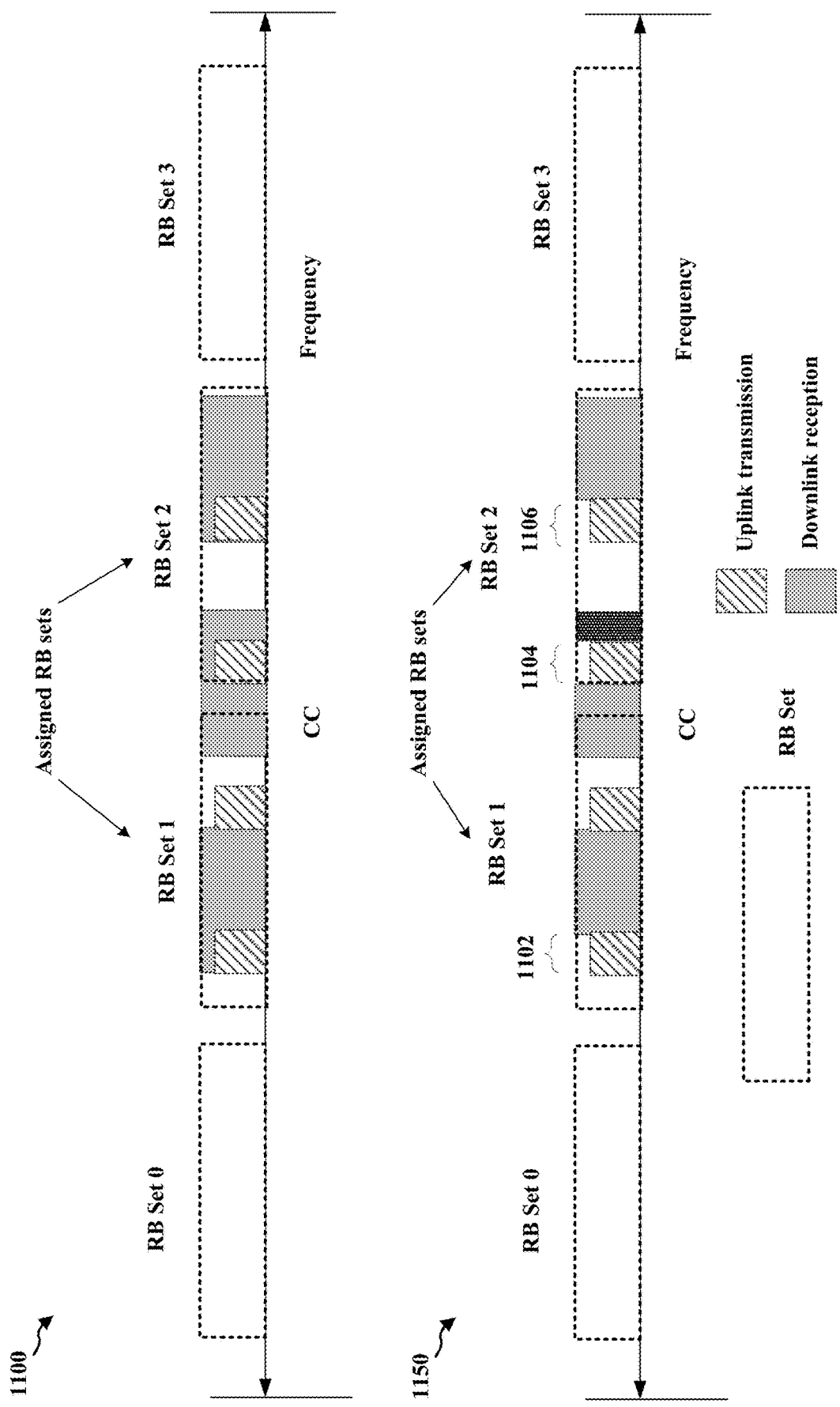
FIG. 11 illustrates examples of in-band full duplex resources and sub-band full duplex resources for an interlaced uplink transmission and an interlaced downlink transmission.

FIG. 11 illustrates a frequency diagram 1100 similar to the example in FIG. 10 that may include in-band full duplex communication with an interlaced uplink transmission and interlaced downlink reception, such as over one or more LBT bandwidths of an unlicensed spectrum. In contrast to the example frequency diagram 1000 in FIG. 10, in FIG. 11, the downlink interlace pattern is not symmetric to the uplink interlace pattern. In some examples, the downlink interlace pattern and the uplink interlace pattern may form an irregular interlaced design. The UE may perform in-band full duplex communication using the interlaced design for the uplink transmission and the downlink reception, as indicated by the base station. For example, the UE may perform reception on the indicated downlink resources whether or not the downlink interlace resources and the uplink interlace resources overlap in frequency. In the example, 1100, the downlink and uplink interlaces partially overlap, and the UE may perform in-band full duplex communication.

In some examples, the UE may use an adjusted set of frequency resources in order to perform sub-band full duplex communication, such as described in connection with 520 in FIG. 5. For example, the base station may drop either the downlink reception or the uplink transmission in frequency resources in which the interlace patterns overlap. For example, the UE may drop downlink reception in RBs of the downlink interlace that overlap with RBs of the uplink interlace. The example frequency diagram 1150 in FIG. 11 may be based on the same uplink and downlink interlace patterns as the frequency diagram 1100. However, as shown in 1150, the UE drops downlink reception at RB(s) 1102, 1104, and 1106 due to the overlap with the uplink interlace. Although FIG. 11 illustrates the UE dropping the downlink reception, the UE may instead drop the uplink transmission if there is an overlap between the uplink and downlink interlace patterns. The base station may indicate to the UE whether to drop the downlink reception or the uplink transmission in response to the overlap. For example, the base station may provide an indication to the UE in RRC signaling or in a medium access control-control element (MAC-CE).

Figure 13:
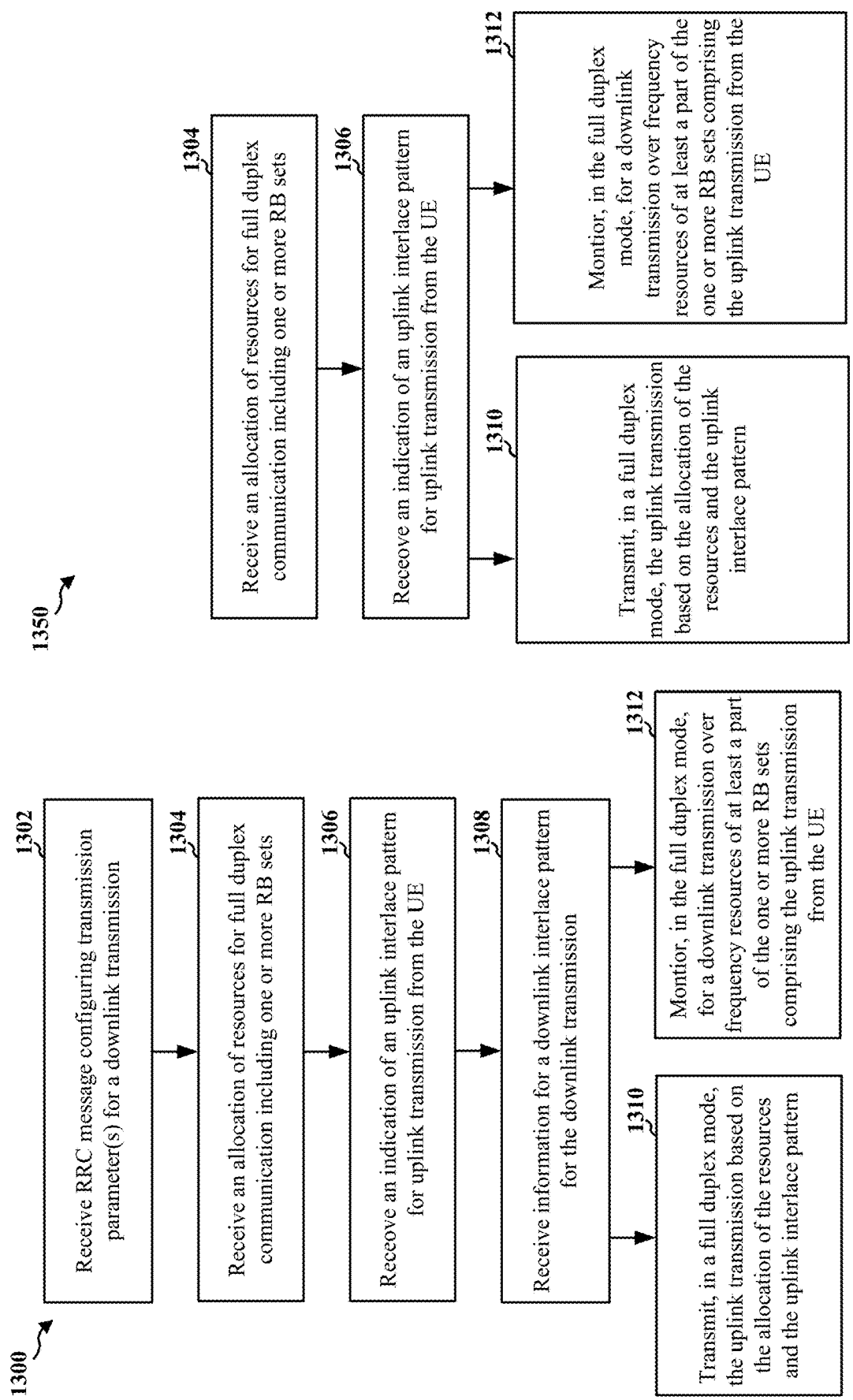
FIGS. 13A and 13B are flowcharts of a method of wireless communication at a UE including full duplex communication including an interlace of an uplink transmission.

FIG. 13A is a flowchart 1300 of a method of wireless communication. The method may be performed by a UE (e.g., the UE 104, 350, 404b, 404c, 1202; the apparatus 1402). The method provides for a more efficient use of wireless resources, e.g., in an unlicensed spectrum by providing for full duplex communication over frequency resources of an interlaced uplink transmission.

At 1304, the UE receives an allocation of resources for full duplex communication including one or more RB sets. Each RB set may correspond to an LBT bandwidth of an unlicensed spectrum, for example. The RB sets may include aspects described in connection with any of FIG. 6-8 or 12. The reception may be performed, e.g., by the resource allocation component 1440 of the apparatus 1402.

At 1306, the UE receives an indication of an uplink interlace pattern for uplink transmission from the UE. The interlace pattern may include aspects described in connection with any of FIGS. 8-12. The reception may be performed, e.g., by the interlace pattern component 1442 of the apparatus 1402.

At 1310, the UE transmits, in a full duplex mode, the uplink transmission based on the allocation of the resources and the uplink interlace pattern. The UE may transmit the uplink communication as described in connection with any of FIGS. 9-12. For example, FIGS. 4B and 4C illustrate examples of a UE performing full duplex communication. The transmission may be performed, e.g., by the transmission component 1434 of the apparatus 1402.

At 1312, the UE monitors, in the full duplex mode, for a downlink transmission over frequency resources of at least a part of the one or more RB sets comprising the uplink transmission from the UE. The monitoring may be performed, e.g., by the reception component 1430 of the apparatus 1402.

The uplink transmission may be interlaced on the frequency resources of the one or more RB sets and the UE may monitor for the downlink transmission over a bandwidth that spans the one or more RB sets, e.g., such as described in connection with FIG. 9. The one or more RB sets may be allocated for the uplink transmission, and the UE monitors a frequency range for the downlink transmission based on the one or more RB sets allocated for the uplink transmission, e.g., such that the downlink resources are indicated implicitly based on the uplink resources. As illustrated at 1302, the UE may receive an RRC message configuring one or more transmission parameters for the downlink transmission, and the resources of the downlink transmission may be determined implicitly based on the uplink resource allocation. The reception may be performed, e.g., by the RRC component 1444 of the apparatus 1402. The UE may monitor for the downlink transmission having a RNTI of a SPS transmission. The UE may monitor for the downlink transmission having a new RNTI. The UE may monitor the frequency range based on an indication that the downlink transmission will be transmitted in the frequency range based on the allocation of resources for the uplink transmission. For example, one or more bits of the uplink allocation may indicate whether the downlink transmission will be transmitted in the frequency range of the uplink allocation.

In some examples, the UE may receive an uplink allocation for the one or more RB sets and a downlink allocation for the one or more RB sets. For example, the downlink scheduling may be explicitly provided to the UE. For example, the downlink allocation may be received in dynamic scheduling for the downlink transmission from a base station, such as in a DCI, or may be configured, such as SPS configuration.

In some examples, the uplink transmission may be interlaced on the frequency resources of the one or more RB sets and the UE may monitor for the downlink transmission that is interlaced on the frequency resources of the one or more RB sets. FIGS. 10 and 11 illustrate examples of interlaced downlink reception along with interlaced uplink transmission.

As illustrated at 1308, the UE may receive information for a downlink interlace pattern for the downlink transmission. The information may be received in one or more of a bitmap format or a RIV format, for example. The reception may be performed, e.g., by the interlace pattern component 1442 of the apparatus 1402.

The uplink interlace pattern may be asymmetric to a downlink interlace pattern, such as illustrated in the examples in FIG. 11. The UE may perform in band full duplex communication in the one or more RB sets if a resource is comprised in both the uplink interlace pattern and the downlink interlace pattern, such as described in connection with 1100. The UE may drop at least one of transmission of the uplink transmission or reception of the downlink transmission in a resource that is comprised in both the uplink interlace pattern and the downlink interlace pattern, such as described in connection with 1150.

One or more of the illustrated operations may be omitted, transposed, or contemporaneous. As a non-limiting example, FIG. 13B illustrates a flowchart 1350 of a method of wireless communication that includes 1304, 1306, 1310, and 1312 described in connection with FIG. 13A.

At 1304, the UE receives an allocation of resources for full duplex communication including one or more RB sets. Each RB set may correspond to an LBT bandwidth of an unlicensed spectrum, for example. The RB sets may include aspects described in connection with any of FIG. 6-8 or 12. The reception may be performed, e.g., by the resource allocation component 1440 of the apparatus 1402.

At 1306, the UE receives an indication of an uplink interlace pattern for uplink transmission from the UE. The interlace pattern may include aspects described in connection with any of FIGS. 8-12. The reception may be performed, e.g., by the interlace pattern component 1442 of the apparatus 1402.

At 1310, the UE transmits, in a full duplex mode, the uplink transmission based on the allocation of the resources and the uplink interlace pattern. The UE may transmit the uplink communication as described in connection with any of FIGS. 9-12. For example, FIGS. 4B and 4C illustrate examples of a UE performing full duplex communication. The transmission may be performed, e.g., by the transmission component 1434 of the apparatus 1402.

At 1312, the UE monitors, in the full duplex mode, for a downlink transmission over frequency resources of at least a part of the one or more RB sets comprising the uplink transmission from the UE. The monitoring may be performed, e.g., by the reception component 1430 of the apparatus 1402.

Figure 14:
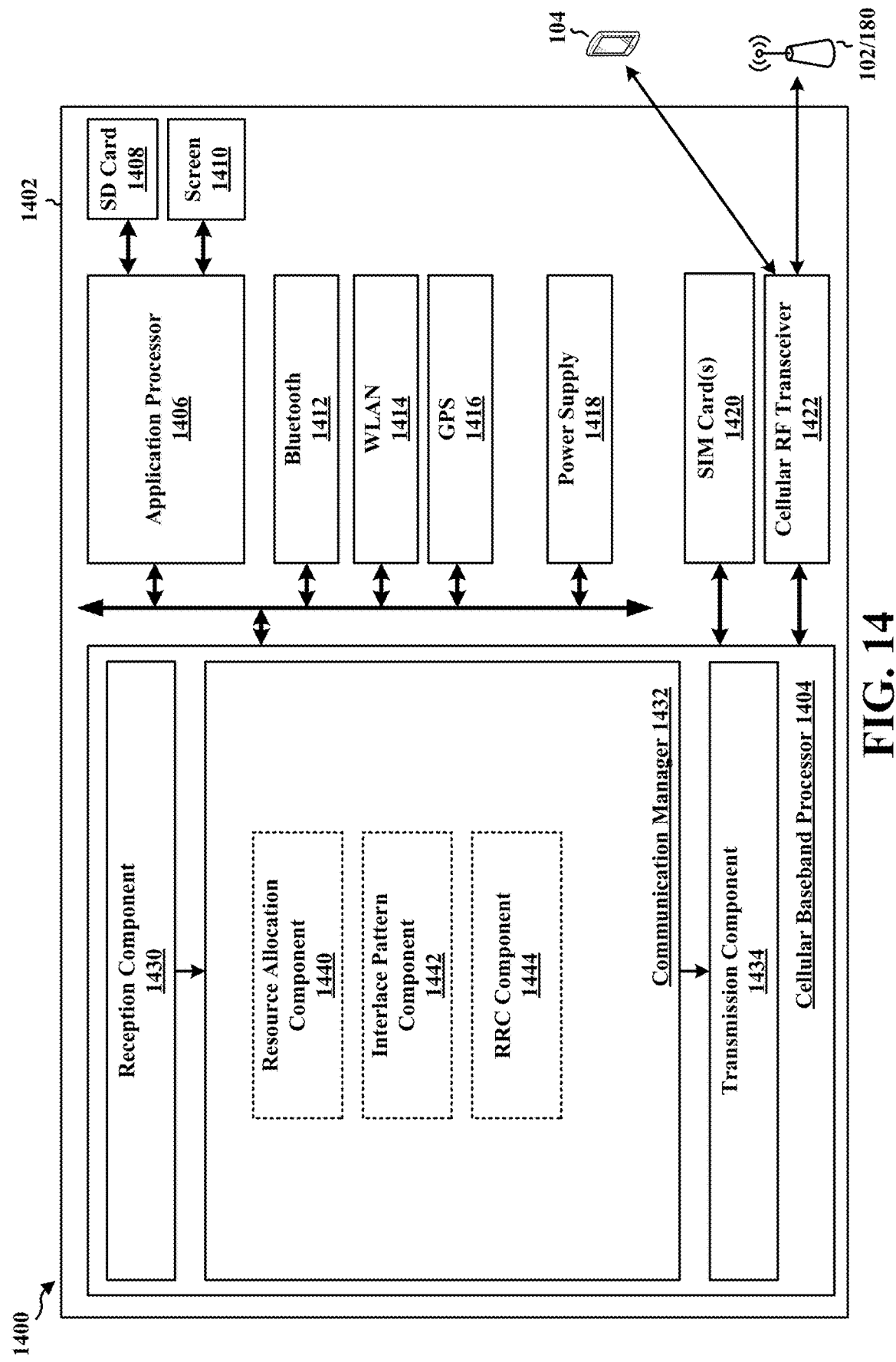
FIG. 14 is a diagram illustrating an example of a hardware implementation for an example apparatus.

FIG. 14 is a diagram 1400 illustrating an example of a hardware implementation for an apparatus 1402. The apparatus 1402 may a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described herein. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a resource allocation component 1440 that is configured to receive an allocation of resources for full duplex communication including one or more RB sets, e.g., as described in connection with 1304. The communication manager 1432 further includes an interlace pattern component 1442 that is configured to receive an indication of an uplink interlace pattern for uplink transmission from the UE, e.g., as described in connection with 1306 and/or 1308. The communication manager 1432 further includes an RRC component 1444 that is configured to receive an RRC message indicating one or more parameters for the downlink reception, e.g., as described in connection with 1302. The transmission component 1434 may be configured to transmit, in a full duplex mode, the uplink transmission based on the allocation of the resources and the uplink interlace pattern, e.g., as described in connection with 1310. The reception component 1430 may be configured to monitor, in the full duplex mode, for a downlink transmission over frequency resources of at least a part of the one or more RB sets comprising the uplink transmission from the UE, e.g., as described in connection with 1312.

The apparatus may include additional components that perform each of the blocks of the algorithm in the flowcharts of FIGS. 13A and 13B or the aspects performed by the UE 1202 in FIG. 12. As such, each block in the flowcharts of FIGS. 13A and 13B or the aspects performed by the UE 1202 in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving an allocation of resources for full duplex communication including one or more resource block (RB) sets; means for receiving an indication of an uplink interlace pattern for uplink transmission from the UE; means for transmitting, in a full duplex mode, the uplink transmission based on the allocation of the resources and the uplink interlace pattern; and means for monitoring, in the full duplex mode, for a downlink transmission over frequency resources of at least a part of the one or more RB sets comprising the uplink transmission from the UE. The apparatus may further include means for receiving an RRC message comprising one or more parameters for the downlink transmission. The apparatus may further include means for receiving an indication of a downlink interlace pattern. The means may be one or more of the components of the apparatus 1402 configured to perform the functions recited by the means. As described herein, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
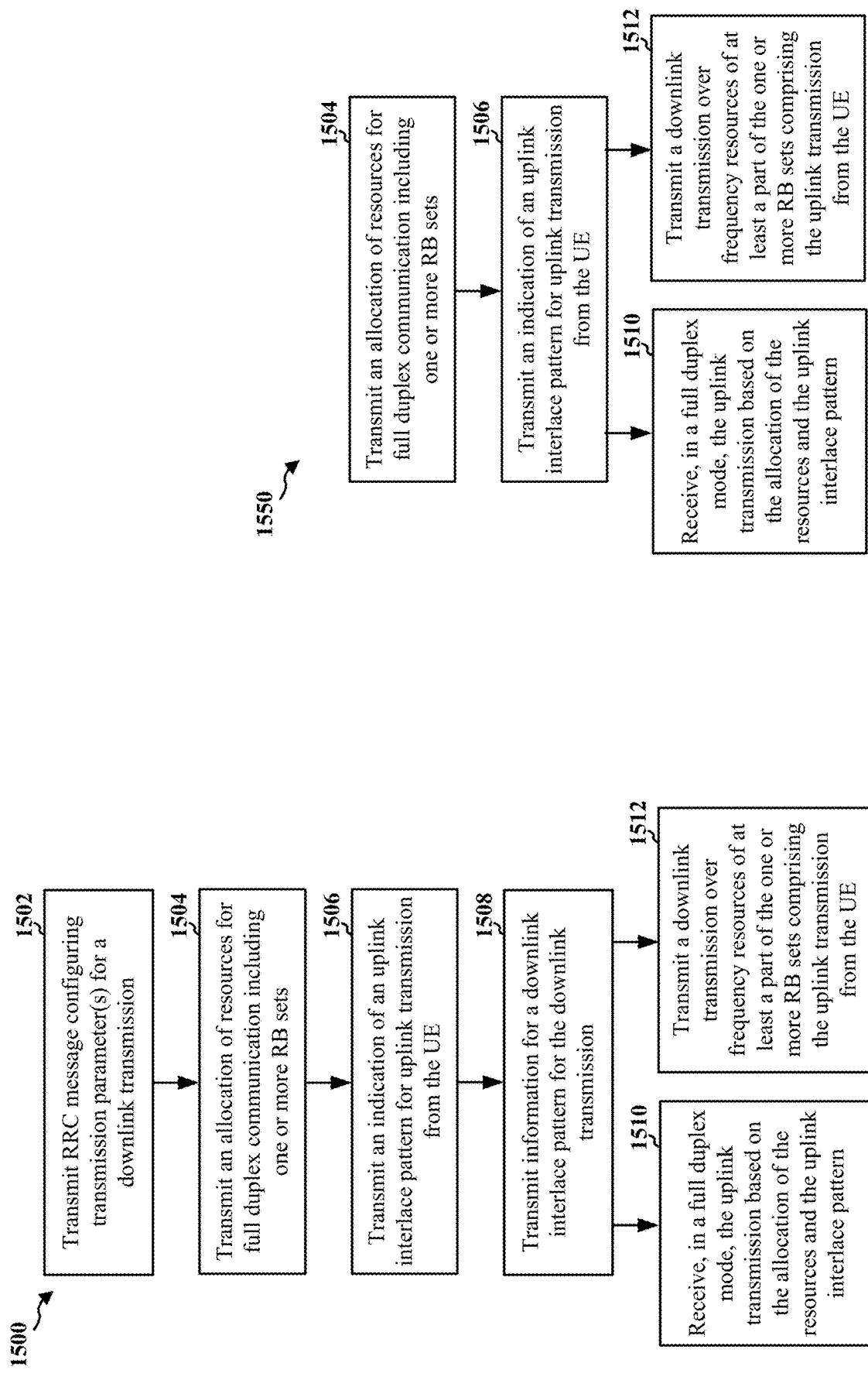
FIGS. 15A and 15B are flowcharts of a method of wireless communication at a base station including full duplex communication with a UE.

FIG. 15 is a flowchart 1500 of a method of wireless communication. The method may be performed by a base station (e.g., the base station 102, 180, 310, 402b, 402c, 1204; the apparatus 1602). The method provides for a more efficient use of wireless resources, e.g., in an unlicensed spectrum by providing for full duplex communication over frequency resources of an interlaced uplink transmission.

At 1504, the base station transmits an allocation of resources to a UE for full duplex communication including one or more RB sets. Each RB set may correspond to an LBT bandwidth of an unlicensed spectrum, for example. The RB sets may include aspects described in connection with any of FIG. 6-8 or 12. The transmission may be performed, e.g., by the resource allocation component 1640 of the apparatus 1602.

At 1506, the base station transmits an indication of an uplink interlace pattern for uplink transmission from the UE. The interlace pattern may include aspects described in connection with any of FIGS. 8-12. The transmission may be performed, e.g., by the interlace pattern component 1642 of the apparatus 1602.

At 1510, the base station receives an uplink transmission from the UE based on the allocation of the resources and the uplink interlace pattern. The base station may receive the uplink communication as described in connection with any of FIGS. 9-12. For example, FIGS. 4B and 4C illustrate examples of full duplex communication. The reception may be performed, e.g., by the reception component 1630 of the apparatus 1602.

At 1512, the base station transmits a downlink transmission over frequency resources of at least a part of the one or more RB sets comprising the uplink transmission from the UE. The transmission may be performed, e.g., by the transmission component 1634 of the apparatus 1602.

The uplink transmission may be interlaced on the frequency resources of the one or more RB sets and the base station transmits the downlink transmission over a bandwidth that spans the one or more RB sets, e.g., as described in connection with FIG. 9. The one or more RB sets may be allocated for the uplink transmission, and the base station transmits the downlink transmission based on the one or more RB sets allocated for the uplink transmission, e.g., in an implicit manner. As illustrated at 1502, the base station may transmit an RRC message configuring one or more transmission parameters for the downlink transmission. The transmission may be performed, e.g., by the RRC component 1644 of the apparatus 1602. The base station may transmit the downlink transmission having a RNTI of a SPS transmission. The base station may transmit the downlink transmission having a new RNTI. The base station may transmit an indication that the downlink transmission will be transmitted in a frequency range based on the allocation of resources for the uplink transmission.

The base station may transmit an uplink allocation over the one or more RB sets and a downlink allocation over the one or more RB sets, e.g., so that the downlink scheduling is explicitly indicated to the UE. The downlink allocation may be transmitted in dynamic scheduling for the downlink transmission from a base station.

The uplink transmission may be interlaced on the frequency resources of the one or more RB sets, and the base station transmits the downlink transmission that is interlaced on the frequency resources of the one or more RB sets, e.g., such as described in connection with FIG. 10 or FIG. 11.

As illustrated at 1508, the base station may transmit information for a downlink interlace pattern for the downlink transmission. The information may be transmitted in one or more of a bitmap format or an RIV format. The transmission may be performed, e.g., by the interlace pattern component 1642 of the apparatus 1602.

The uplink interlace pattern may be asymmetric to a downlink interlace pattern.

The uplink transmission and the downlink transmission may be based on in band full duplex communication for the UE in the one or more RB sets if a resource is comprised in both the uplink interlace pattern and the downlink interlace pattern, e.g., as described in connection with 1100.

In some examples, at least one of transmission of the uplink transmission or reception of the downlink transmission may be dropped in a resource that is comprised in both the uplink interlace pattern and the downlink interlace pattern, e.g., as described in connection with 1150.

One or more of the illustrated operations may be omitted, transposed, or contemporaneous. As a non-limiting example, FIG. 15B illustrates a flowchart 1550 of a method of wireless communication that includes 1504, 1506, 1510, and 1512 described in connection with FIG. 15A.

At 1504, the base station transmits an allocation of resources to a UE for full duplex communication including one or more RB sets. Each RB set may correspond to an LBT bandwidth of an unlicensed spectrum, for example. The RB sets may include aspects described in connection with any of FIG. 6-8 or 12. The transmission may be performed, e.g., by the resource allocation component 1640 of the apparatus 1602.

At 1506, the base station transmits an indication of an uplink interlace pattern for uplink transmission from the UE. The interlace pattern may include aspects described in connection with any of FIGS. 8-12. The transmission may be performed, e.g., by the interlace pattern component 1642 of the apparatus 1602.

At 1510, the base station receives an uplink transmission from the UE based on the allocation of the resources and the uplink interlace pattern. The base station may receive the uplink communication as described in connection with any of FIGS. 9-12. For example, FIGS. 4B and 4C illustrate examples of full duplex communication. The reception may be performed, e.g., by the reception component 1630 of the apparatus 1602.

At 1512, the base station transmits a downlink transmission over frequency resources of at least a part of the one or more RB sets comprising the uplink transmission from the UE. The transmission may be performed, e.g., by the transmission component 1634 of the apparatus 1602.

Figure 16:
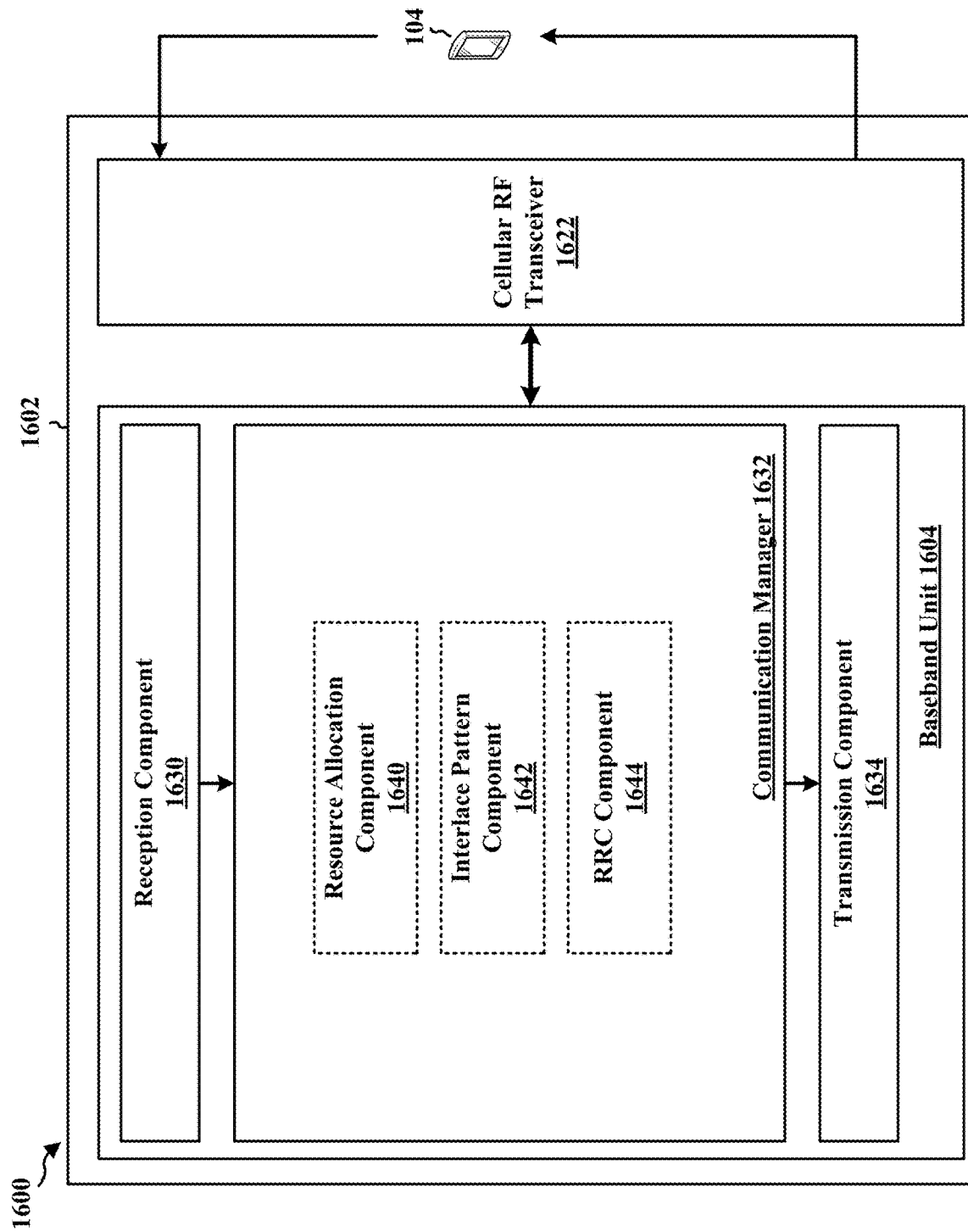
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described herein. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a resource allocation component 1440 that is configured to transmit an allocation of resources for full duplex communication including one or more RB sets, e.g., as described in connection with 1504. The communication manager 1632 further includes an interlace pattern component 1642 that is configured to transmit an indication of an uplink interlace pattern for uplink transmission for the UE, e.g., as described in connection with 1506 and/or 1508. The communication manager 1632 further includes an RRC component 1644 that is configured to transmit an RRC message indicating one or more parameters for the downlink reception, e.g., as described in connection with 1502. The transmission component 1634 may be configured to transmit a downlink transmission based on the allocation of the resources and the downlink interlace pattern, e.g., as described in connection with 1512. The reception component 1630 may be configured to monitor for an uplink transmission over frequency resources of at least a part of the one or more RB sets comprising the uplink transmission from the UE and the uplink interlace pattern, e.g., as described in connection with 1510.

The apparatus may include additional components that perform each of the blocks of the algorithm in the flowchart of FIG. 15 or the aspects performed by the base station 1204 in FIG. 12. As such, each block in the flowchart of FIG. 15 or the aspects performed by the base station 1204 in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting an allocation of resources to a UE for full duplex communication including one or more RB sets; means for transmitting an indication of an uplink interlace pattern for uplink transmission from the UE; means for receiving an uplink transmission from the UE based on the allocation of the resources and the uplink interlace pattern; and means for transmitting a downlink transmission over frequency resources of at least a part of the one or more RB sets comprising the uplink transmission from the UE. The apparatus may further include means for transmitting an RRC message configuring one or more transmission parameters for the downlink transmission. The apparatus may further include means for transmitting information for a downlink interlace pattern for the downlink transmission. The means may be one or more of the components of the apparatus 1602 configured to perform the functions recited by the means. As described herein, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

The following example aspects are illustrative only and may be combined with other aspects or teachings described herein, without limitation.

Aspect 1 is a method of wireless communication at a UE, comprising: receiving an allocation of resources for full duplex communication including one or more RB sets; receiving an indication of an uplink interlace pattern for uplink transmission from the UE; transmitting, in a full duplex mode, the uplink transmission based on the allocation of the resources and the uplink interlace pattern; and monitoring, in the full duplex mode, for a downlink transmission over frequency resources of at least a part of the one or more RB sets comprising the uplink transmission from the UE.

In aspect 2, the method of aspect 1 further includes that the uplink transmission is interlaced on the frequency resources of the one or more RB sets and the UE monitors for the downlink transmission over a bandwidth that spans the one or more RB sets.

In aspect 3, the method of aspect 1 or aspect 2 further includes that the one or more RB sets are allocated for the uplink transmission, and the UE monitors a frequency range for the downlink transmission based on the one or more RB sets allocated for the uplink transmission.

In aspect 4, the method of any of aspects 1 to 3 further includes receiving an RRC message configuring one or more transmission parameters for the downlink transmission.

In aspect 5, the method of any of aspects 1 to 4 further includes that the UE monitors for the downlink transmission having a RNTI of a SPS transmission.

In aspect 6, the method of any of aspects 1 to 5 further includes that the UE monitors for the downlink transmission having a new RNTI.

In aspect 7, the method of any of aspects 1 to 6 further includes that the UE monitors the frequency range based on an additional indication that the downlink transmission will be transmitted in the frequency range based on the allocation of uplink resources for the uplink transmission.

In aspect 8, the method of any of aspects 1 to 7 further includes that the UE receives an uplink allocation for the one or more RB sets and a downlink allocation for the one or more RB sets.

In aspect 9, the method of any of aspects 1 to 8 further includes that the downlink allocation is received in dynamic scheduling for the downlink transmission from a base station.

In aspect 10, the method of aspect 1 further includes that the uplink transmission is interlaced on the frequency resources of the one or more RB sets and the UE monitors for the downlink transmission that is interlaced on the frequency resources of the one or more RB sets.

In aspect 11, the method of aspects 1 or 10 further includes receiving information for a downlink interlace pattern for the downlink transmission.

In aspect 12, the method of any of aspects 1, 10, or 11 further includes that the information is received in one or more of a bitmap format or a RIV format.

In aspect 13, the method of any of aspects 1 or 10 to 12 further includes that the uplink interlace pattern is asymmetric to a downlink interlace pattern.

In aspect 14, the method of any of aspects 1 or 10 to 12 further includes that the UE performs in band full duplex communication in the one or more RB sets if a resource is comprised in both the uplink interlace pattern and the downlink interlace pattern.

In aspect 15, the method of any of aspects 1 or 10 to 12 further includes that the UE drops at least one of transmission of the uplink transmission or reception of the downlink transmission in a resource that is comprised in both the uplink interlace pattern and the downlink interlace pattern.

Aspect 16 is a device including one or more processors and one or more memories in electronic communication with the one or more processors storing instructions executable by the one or more processors to cause the device to implement a method as in any of aspects 1-15.

In aspect 17, the device of aspect 16 further includes at least one antenna and a transceiver coupled to the at least one antenna and the at least one processor.

Aspect 18 is a system or apparatus including means for implementing a method or realizing an apparatus as in any of aspects 1-15.

In aspect 19, the system or apparatus of aspect 18 further includes at least one antenna and a transceiver coupled to the at least one antenna and the at least one processor.

Aspect 20 is a non-transitory computer readable medium storing instructions executable by one or more processors to cause the one or more processors to implement a method as in any of aspects 1-15.

Aspect 21 is a method of wireless communication at a base station, comprising: transmitting an allocation of resources to a UE for full duplex communication including one or more RB sets; transmitting an indication of an uplink interlace pattern for uplink transmission from the UE; receiving the uplink transmission from the UE based on the allocation of the resources and the uplink interlace pattern; and transmitting a downlink transmission over frequency resources of at least a part of the one or more RB sets comprising the uplink transmission from the UE.

In aspect 22, the method of aspect 21 further includes that the uplink transmission is interlaced on the frequency resources of the one or more RB sets and the base station transmits the downlink transmission over a bandwidth that spans the one or more RB sets.

In aspect 23, the method of aspect 21 or aspect 22 further includes that the one or more RB sets are allocated for the uplink transmission, and the base station transmits the downlink transmission based on the one or more RB sets allocated for the uplink transmission.

In aspect 24, the method of any of aspects 21 to 23 further includes transmitting an RRC message configuring one or more transmission parameters for the downlink transmission.

In aspect 25, the method of any of aspects 21 to 24 further includes that the base station transmits the downlink transmission having a RNTI of a SPS transmission.

In aspect 25, the method of any of aspects 21 to 25 further includes that the base station transmits the downlink transmission having a new RNTI.

In aspect 27, the method of any of aspects 21 to 26 further includes that the base station transmits an additional indication that the downlink transmission will be transmitted in a frequency range based on the allocation of uplink resources for the uplink transmission.

In aspect 28, the method of any of aspects 21 to 27 further includes that the base station transmits an uplink allocation over the one or more RB sets and a downlink allocation over the one or more RB sets.

In aspect 29, the method of any of aspects 21 to 28 further includes that the downlink allocation is transmitted in dynamic scheduling for the downlink transmission from the base station.

In aspect 30, the method of aspect 21 further includes that the uplink transmission is interlaced on the frequency resources of the one or more RB sets and the base station transmits the downlink transmission that is interlaced on the frequency resources of the one or more RB sets.

In aspect 31, the method of any of aspect 21 or 30 further includes transmitting information for a downlink interlace pattern for the downlink transmission.

In aspect 32, the method of any of aspects 21, 30, or 31 further includes that the information is transmitted in one or more of a bitmap format or a RIV format.

In aspect 33, the method of any of aspects 21 or 30 to 32 further includes that the uplink interlace pattern is asymmetric to a downlink interlace pattern.

In aspect 34, the method of any of aspects 21 or 30 to 32 further includes that the uplink transmission and the downlink transmission are based on in band full duplex communication for the UE in the one or more RB sets if a resource is comprised in both the uplink interlace pattern and the downlink interlace pattern.

In aspect 35, the method of any of aspects 21 or 30 to 32 further includes that the at least one of transmission of the uplink transmission or reception of the downlink transmission is dropped in a resource that is comprised in both the uplink interlace pattern and the downlink interlace pattern.

Aspect 36 is a device including one or more processors and one or more memories in electronic communication with the one or more processors storing instructions executable by the one or more processors to cause the device to implement a method as in any of aspects 21-35.

In aspect 37, the device of aspect 36 further includes at least one antenna and a transceiver coupled to the at least one antenna and the at least one processor.

Aspect 38 is a system or apparatus including means for implementing a method or realizing an apparatus as in any of aspects 21-35.

In aspect 39, the system or apparatus of aspect 38 further includes at least one antenna and a transceiver coupled to the at least one antenna and the at least one processor.

Aspect 40 is a non-transitory computer readable medium storing instructions executable by one or more processors to cause the one or more processors to implement a method as in any of aspects 21-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   memory; and
   at least one processor coupled to the memory and configured to:
   receive an allocation of resources for full duplex communication including one or more resource block (RB) sets;
   receive an indication of an uplink interlace pattern for uplink transmission from the UE in the resources allocated for the full duplex communication;
   transmit, in a full duplex mode, the uplink transmission based on the allocation of the resources and the uplink interlace pattern; and
   monitor, in the full duplex mode, for a downlink transmission over frequency resources of at least a part of the one or more RB sets comprising the uplink transmission having the uplink interlace pattern from the UE.

2. The apparatus of claim 1, wherein the uplink transmission is interlaced on the frequency resources of the one or more RB sets and the at least one processor is configured to monitor for the downlink transmission over a bandwidth that spans the one or more RB sets.

3. The apparatus of claim 2, wherein the one or more RB sets are allocated for the uplink transmission, and the at least one processor is configured to monitor a frequency range for the downlink transmission based on the one or more RB sets allocated for the uplink transmission.

4. The apparatus of claim 3, wherein the at least one processor is further configured to:
   receive a radio resource control (RRC) message configuring one or more transmission parameters for the downlink transmission.

5. The apparatus of claim 3, wherein the at least one processor is configured to monitor for the downlink transmission having a radio network temporary identifier (RNTI) of a semi-persistent scheduling (SPS) transmission.

6. The apparatus of claim 3, wherein the at least one processor is configured to monitor for the downlink transmission having a new radio network temporary identifier (RNTI).

7. The apparatus of claim 3, wherein the at least one processor is configured to monitor the frequency range based on an additional indication that the downlink transmission will be transmitted in the frequency range based on the allocation of uplink resources for the uplink transmission.

8. The apparatus of claim 2, wherein the at least one processor is configured to receive an uplink allocation for the one or more RB sets and a downlink allocation for the one or more RB sets.

9. The apparatus of claim 8, wherein the at least one processor is configured to receive the downlink allocation in dynamic scheduling for the downlink transmission from a base station.

10. The apparatus of claim 1, wherein the uplink transmission is interlaced on the frequency resources of the one or more RB sets and the at least one processor is configured to monitor for the downlink transmission that is interlaced on the frequency resources of the one or more RB sets.

11. The apparatus of claim 10, wherein the at least one processor is further configured to:
    receive information for a downlink interlace pattern for the downlink transmission.

12. The apparatus of claim 10, wherein the uplink interlace pattern is asymmetric to a downlink interlace pattern.

13. The apparatus of claim 12, wherein the at least one processor is configured to perform in band full duplex communication in the one or more RB sets if a resource is comprised in both the uplink interlace pattern and the downlink interlace pattern.

14. The apparatus of claim 12, wherein the UE drops at least one of transmission of the uplink transmission or reception of the downlink transmission in a resource that is comprised in both the uplink interlace pattern and the downlink interlace pattern.

15. The apparatus of claim 1, further comprising:
    at least one antenna; and
    a transceiver coupled to the at least one processor and the at least one antenna.

16. A method of wireless communication at a user equipment (UE), comprising:
    receiving an allocation of resources for full duplex communication including one or more resource block (RB) sets;
    receiving an indication of an uplink interlace pattern for uplink transmission from the UE in the resources allocated for the full duplex communication;
    transmitting, in a full duplex mode, the uplink transmission based on the allocation of the resources and the uplink interlace pattern; and
    monitoring, in the full duplex mode, for a downlink transmission over frequency resources of at least a part of the one or more RB sets comprising the uplink transmission having the uplink interlace pattern from the UE.

17. An apparatus for wireless communication at a base station, comprising:
    memory; and
    at least one processor coupled to the memory and configured to:
    transmit an allocation of resources to a user equipment (UE) for full duplex communication including one or more resource block (RB) sets;
    transmit an indication of an uplink interlace pattern for uplink transmission from the UE in the resources allocated for the full duplex communication;
    receive the uplink transmission from the UE based on the allocation of the resources and the uplink interlace pattern; and
    transmit a downlink transmission over frequency resources of at least a part of the one or more RB sets comprising the uplink transmission having the uplink interlace pattern from the UE.

18. The apparatus of claim 17, wherein the uplink transmission is interlaced on the frequency resources of the one or more RB sets and the at least one processor is configured to transmit the downlink transmission over a bandwidth that spans the one or more RB sets.

19. The apparatus of claim 18, wherein the one or more RB sets are allocated for the uplink transmission, and the at least one processor is configured to transmit the downlink transmission based on the one or more RB sets allocated for the uplink transmission.

20. The apparatus of claim 19, the at least one processor is configured to transmit the downlink transmission having a radio network temporary identifier (RNTI) of a semi-persistent scheduling (SPS) transmission or a new RNTI.

21. The apparatus of claim 19, wherein the at least one processor is configured to transmit an additional indication that the downlink transmission will be transmitted in a frequency range based on the allocation of uplink resources for the uplink transmission.

22. The apparatus of claim 18, the at least one processor is configured to transmit an uplink allocation over the one or more RB sets and a downlink allocation over the one or more RB sets.

23. The apparatus of claim 22, wherein the at least one processor is configured to transmit the downlink allocation in dynamic scheduling for the downlink transmission from the base station.

24. The apparatus of claim 17, wherein the uplink transmission is interlaced on the frequency resources of the one or more RB sets and the at least one processor is configured to transmit the downlink transmission that is interlaced on the frequency resources of the one or more RB sets.

25. The apparatus of claim 24, wherein the at least one processor is further configured to:
transmit information for a downlink interlace pattern for the downlink transmission.

26. The apparatus of claim 24, wherein the uplink interlace pattern is asymmetric to a downlink interlace pattern.

27. The apparatus of claim 26, wherein the uplink transmission and the downlink transmission are based on in band full duplex communication for the UE in the one or more RB sets if a resource is comprised in both the uplink interlace pattern and the downlink interlace pattern.

28. The apparatus of claim 26, wherein the at least one processor is configured to drop at least one of transmission of the uplink transmission or reception of the downlink transmission in a resource that is comprised in both the uplink interlace pattern and the downlink interlace pattern.

29. The apparatus of claim 17, further comprising:
at least one antenna; and
a transceiver coupled to the at least one processor and the at least one antenna.

30. A method of wireless communication at a base station, comprising:
transmitting an allocation of resources to a user equipment (UE) for full duplex communication including one or more resource block (RB) sets;
transmitting an indication of an uplink interlace pattern for uplink transmission from the UE in the resources allocated for the full duplex communication;
receiving the uplink transmission from the UE based on the allocation of the resources and the uplink interlace pattern; and
transmitting a downlink transmission over frequency resources of at least a part of the one or more RB sets comprising the uplink transmission having the uplink interlace pattern from the UE.

* * * * *